United States Patent
Park et al.

(10) Patent No.: US 10,664,064 B2
(45) Date of Patent: May 26, 2020

(54) INPUT DEVICE IMPLEMENTING PREDICTIVE INPUT METHOD BY ASSIGNING CHARACTERS TO KEYS

(71) Applicants: Taeun Park, Seoul (KR); Sangjung Shim, Seoul (KR)

(72) Inventors: Taeun Park, Seoul (KR); Sangjung Shim, Seoul (KR)

(*) Notice: Subject to any disclaimer, the term of this patent is extended or adjusted under 35 U.S.C. 154(b) by 0 days.

(21) Appl. No.: 15/974,892

(22) Filed: May 9, 2018

(65) Prior Publication Data

US 2018/0329513 A1 Nov. 15, 2018

Related U.S. Application Data

(63) Continuation of application No. PCT/KR2016/012859, filed on Nov. 9, 2016.

(30) Foreign Application Priority Data

Nov. 9, 2015 (KR) .................. 10-2015-0156313
Oct. 5, 2016 (KR) .................. 10-2016-0127977

(51) Int. Cl.
G06F 3/023 (2006.01)
G06F 3/0488 (2013.01)
G06F 3/0489 (2013.01)
H04M 1/725 (2006.01)

(52) U.S. Cl.
CPC .......... *G06F 3/0237* (2013.01); *G06F 3/023* (2013.01); *G06F 3/0236* (2013.01); *G06F 3/0489* (2013.01); *G06F 3/04886* (2013.01); *H04M 1/72552* (2013.01); *H04M 2250/70* (2013.01)

(58) Field of Classification Search
CPC ..................................................... G06F 3/0237
See application file for complete search history.

(56) References Cited

U.S. PATENT DOCUMENTS

| | | | | |
|---|---|---|---|---|
| 2007/0016862 A1* | 1/2007 | Kuzmin | ............... | G06F 3/0236 715/700 |
| 2007/0076862 A1* | 4/2007 | Chatterjee | ............ | G06F 17/276 379/433.06 |
| 2010/0131900 A1* | 5/2010 | Spetalnick | ............ | G06F 17/276 715/825 |
| 2013/0246329 A1 | 9/2013 | Pasquero et al. | | |

FOREIGN PATENT DOCUMENTS

| | | |
|---|---|---|
| KR | 100774050 B1 | 11/2007 |
| KR | 1020100057880 A | 6/2010 |
| KR | 1020130110114 A | 10/2013 |
| KR | 1020140119763 A | 10/2014 |

OTHER PUBLICATIONS

International Search Report for PCT/KR2016/012859 dated Feb. 8, 2017, 8 pages.

* cited by examiner

*Primary Examiner* — William Boddie
*Assistant Examiner* — Andrew B Schnirel
(74) *Attorney, Agent, or Firm* — Hamre, Schumann, Mueller & Larson, P.C.

(57) ABSTRACT

The present invention brings the easiness in the input of non-vocabulary phrase and sentence by applying the disambiguation input method used as a predictive input method for words in English-speaking countries to non-vocabulary phrases and sentences including not only characters but also 'space' and symbols.

5 Claims, 9 Drawing Sheets

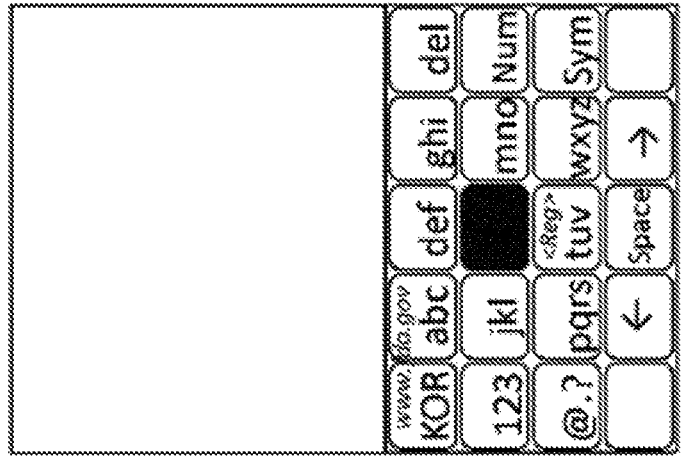
FIG. 1B
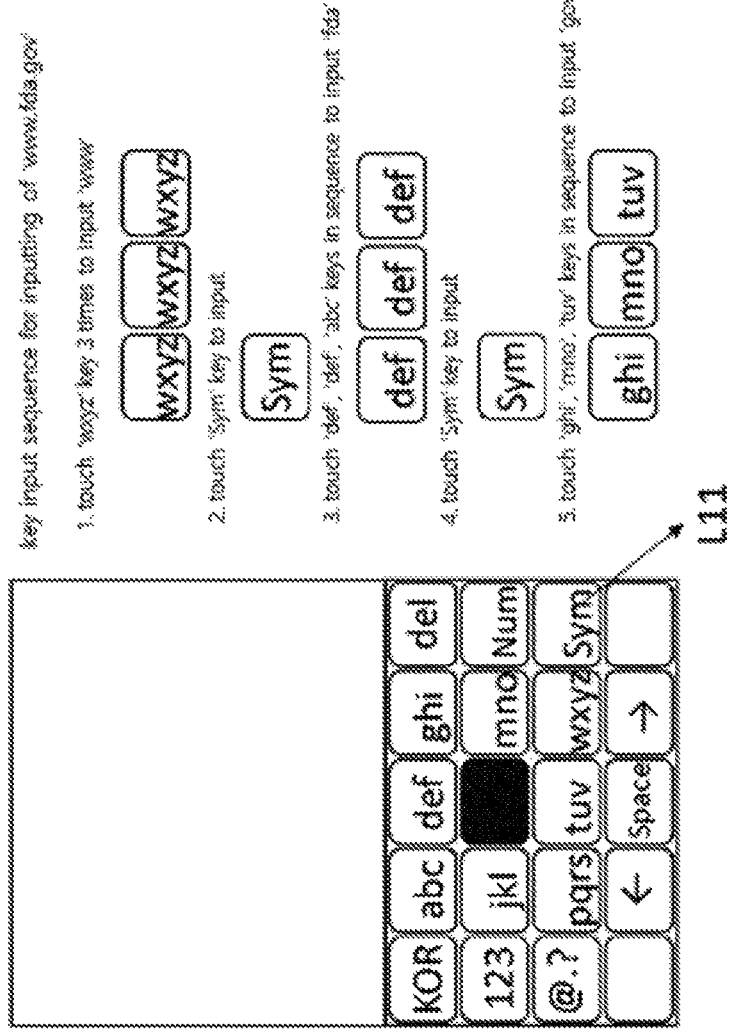
FIG. 1A
FIG. 1C

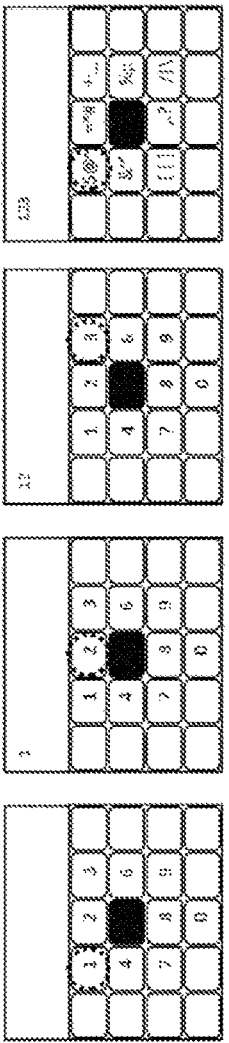
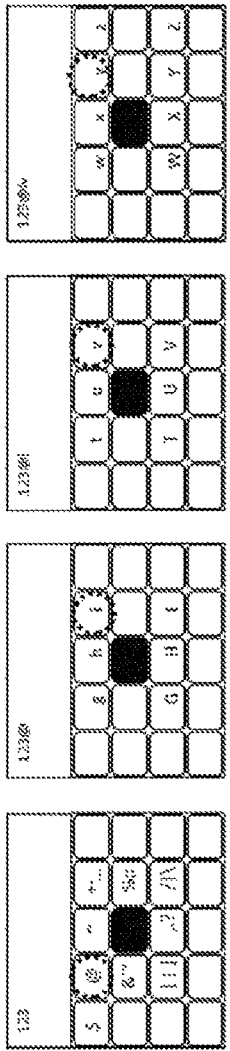
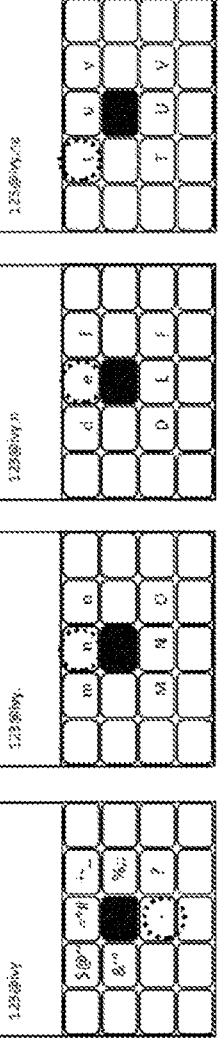
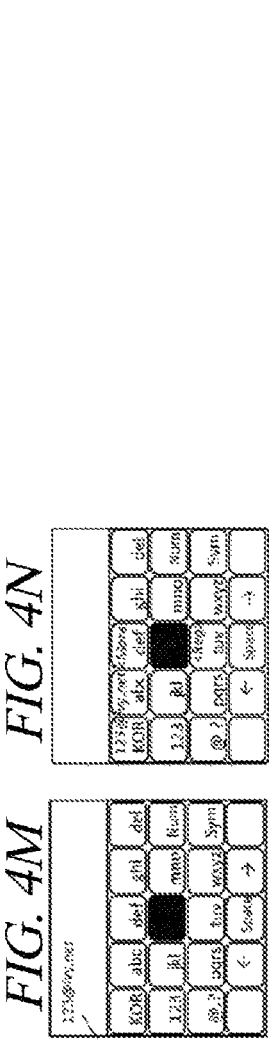

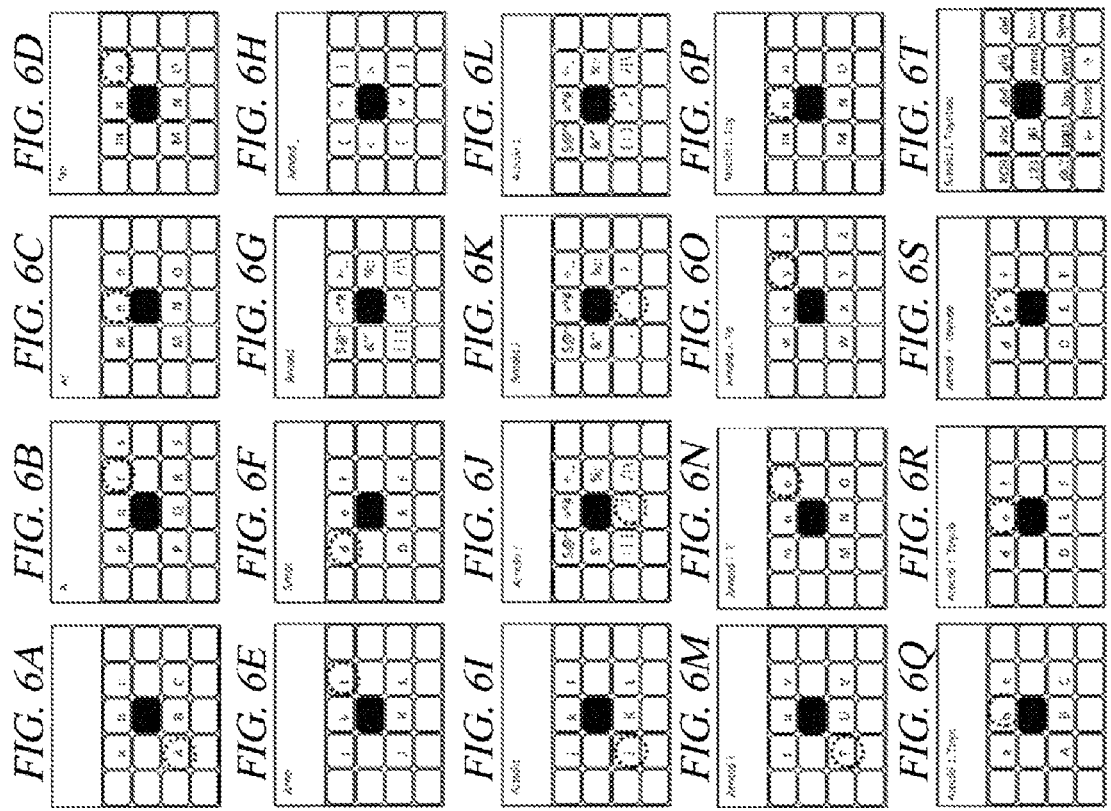

INPUT DEVICE IMPLEMENTING PREDICTIVE INPUT METHOD BY ASSIGNING CHARACTERS TO KEYS

CROSS-REFERENCE TO RELATED APPLICATION

This application is a Bypass Continuation under 35 U.S.C. § 111(a) of PCT Application No. PCT/KR2016/012859 filed on Nov. 9, 2016, which claims the benefit of Korean Patent Application No. 2015-0156313 filed on Nov. 9, 2015, and Korean Patent Application No. 2016-0127977 filed on Oct. 5, 2016, the disclosures of which are incorporated herein by reference.

TECHNICAL FIELD

The embodiments described herein pertain generally to a predictive input device implementing a predictive input method.

BACKGROUND

As mobile phones began to be used, message communication started to become popular, and as mobile phones evolved to smartphones, the message calls got bigger in number than the voice calls. Furthermore, the smartphone is not used simply for a message delivery, but for the input of non-vocabulary terms such as a web address and e-mail due to its function as a multimedia communication means. This non-vocabulary input is inconvenient due to the cases for which it is inevitable to input characters and symbols alternately, unlike the case of general input of characters. Nevertheless, when the full keyboard of a computer is used, the input of characters and symbols is easily done, but it is much more difficult than inputting characters only on mobile devices which need to input with only two fingers. Especially it is very difficult to input characters and symbols using the keypad consisting of 12 keys including the numbers 0 to 9 and '*' and '#' keys. In order to input just the alphabetic characters, the disambiguation input method using 12 keypads has been used in the English-speaking countries. However, the input of the phrases mixed with the alphabets and symbols as in the cases mentioned above is inconvenient since characters and symbols are inputted separately. In this background, the present invention provides a method enabling the input of not only words but also phrases or sentences including symbols and 'spaces' for a keypad composed of a conventional twelve keys by utilizing the disambiguation input method which has been widely used in the English-speaking countries.

DISCLOSURE OF THE INVENTION

Problems to be Solved by the Invention

The language used by human beings mainly consists of vocabularies. Since the language for communication is completed by a list of vocabularies, the symbol has been separated into elements that are different from the words in describing the meaning of spoken language. However, as the Internet became popular and the computer terms are commonly used with human language, the symbol evolved from the function of connecting the meaning of the word to the level having the essential meaning like the word. For example, in www.fda.gov, which represents the address of the US FDA, a period "." is not simply a component for the end-of-sentence, but rather a component functioning the same as letters, indicating the meaning of the address.

In the case of a qwerty keyboard in which all characters and symbols are assigned to respective keys, a web address or a password in which characters and symbols are used together can be easily inputted. However, in the case where space for a keyboard is limited as in a wearable device such as a smart watch, a keypad with a small number of keys should be considered. It is, therefore, possible to utilize the disambiguation input method which has already been used in the English-speaking countries for convenient and quick input with the keypad of a limited number of keys. However, even if the disambiguation input method is applied, the input of the web address or the password is still inconvenient because it accompanies the switch from the character mode to the symbol mode. For this reason, the function of smart-watch remains in the level of simply receiving messages with no need of input. Furthermore, if one tries to text a message, people should use only one hand and the size of the key is small, which makes a smartwatch much more difficult to use than the conventional qwerty keyboard with respect to the input speed and convenience. In this background, the present invention has developed disambiguation input method as a sentence (phrase) disambiguation input method for easy and quick inputting in a device such as a smart watch having an input space limited and provide a method for dramatically increased input efficiency for the input of sentences and web addresses.

Means for Solving the Problems

With the use of mobile phones, the major mobile communication has gradually evolved from voice to message communication, and the qwerty keyboard used in computers has been changed to a keypad with 12 keys due to the limited space in the cellular phone and input systems appropriate for it have been developed. Especially in English-speaking countries (including China and Japan), several characters are assigned to each key on the keypad of the cellular phone, and the keys have to be pressed a couple of times in order to input these characters. To solve the inconvenience of multi-tapping of a key for inputting a character, the disambiguation input method has been devised and widely used. The disambiguation input method is a method of reducing the number of presses by allowing a user to input a desired word even if the user presses a designated key only once for a character. If this is explained in reference to a keyboard shown in FIGS. 1A-1C, the 'abc' key is tapped twice to input 'b', 'mno' key is tapped three times to enter 'o' and finally 'wxyz' key is tapped three times to enter 'y' in order to input a word 'boy' which is the case of multi-tapping. On the other hand, in the case of the disambiguation input method, 'abc', 'mno', and 'wxyz' keys representing 'b', 'o' and 'y' in 'boy' are tapped once and words that can be made up of the combination of characters specified in these keys (for example, 'any', 'amy', 'boy', 'box', 'cow', 'bow', 'cox' 'coy', etc.) are extracted from the dictionary database. These extracted words are displayed as a predicted word (indicated in italics in the key) as shown in FIGS. 2A-2C, and input is performed by selecting the word 'boy' to be inputted from among these words. For the disambiguation input method, as shown in the above example, a dictionary database in which words including 'boy' are registered should be prepared and used. In the present invention, not only words but also web addresses such as 'www.fda.gov' are included in the dictionary database. There is 'Sym' key to which symbols including the period "." are designated along with other keys to which characters are designated. Then if keys are tapped in sequence shown in Expression (1) to input 'www.fda.gov', 'www.fda.gov' is displayed as a predicted candidate (shown in italics in the keyboard) as shown in FIG. 1C and is inputted by selecting it. Therefore, it is not necessary to switch from the character mode to the symbol mode to input the period "." and it is possible to input 'www.fda.gov' by the key input corresponding to Expression (1).

$$\text{'wxyz'-'wxyz'-'wxyz'-'Sym'-'def'-'def'-'abc'-'Sym'-'ghi'-'mno'-'tuv'} \quad (1)$$

That is, you can enter 'www.fda.gov' with only eleven keystrokes without switching from character mode to symbol mode. The keyboard shown in FIGS. 1A-1C can be replaced by a keypad composed of nine keys shown in FIG. 9A. Consequently, the present invention provides a method in which a web address and a password composed of characters and symbols can be easily inputted as in the qwerty keyboard even if only nine keys are used.

And the details of the present invention will be described through the definitions of terms to be used hereinafter.

TABLE 0

| Terms | Example |
| --- | --- |
| ambiguous key | 'abc', 'def', 'ghi' |
| ambiguous key sequence | 'ghi'-'tuv'-'wxyz' |
| numeric code | '0', '1', '2' |
| numeric code sequence | '99902210368' |

Ambiguous key means that it is a key to which several characters are assigned. And all the assigned characters are included in the selection without selecting specific character among the designated characters when the key is pressed. It is, therefore, the key input for disambiguation input method. Consequently, all the characters assigned to a key are displayed in single quotation marks (' . . . ') as shown in the second column of Table 0. 'Ambiguous key sequence' is the sequence of 'ambiguous keys', and numeric code is defined to convert an 'ambiguous key sequence' into a sequence of numbers to convert it to a numeric form. The relationship between the ambiguous key of Table 1 and the corresponding 'numeric code' is set based on the key arrangement of the keypad shown in FIG. 1A. If the key arrangement of the keypad is changed, the relationship of Table 1 is also changed. Therefore, 'ambiguous key sequence' represented by a sequence of ambiguous key is converted into 'numeric code sequence' using 'numeric code'. Hence, the 'ambiguous key sequence' in Expression (1) is converted into a numeric code sequence in Expression (2).

$$\text{'99902210368'} \quad (2)$$

TABLE 1

<Conversion relation between ambiguous key and numeric code>

| | ambiguous key | | | | | | | |
| --- | --- | --- | --- | --- | --- | --- | --- | --- |
| | 'abc' | 'def' | 'ghi' | 'jkl' | 'mno' | 'pqrs' | 'tuv' | 'wxyz' |
| | | | | numeric code | | | | |
| | 1 | 2 | 3 | 4 | 6 | 7 | 8 | 9 |
| ambiguous key | | 'Num' | | | | | 'Sym' | |
| numeric code | | 5 | | | | | 0 | |

In one exemplary embodiment, there is provided an input device implementing a predictive input method including a word input method in which a plurality of characters are assigned to each of a plurality of keys, and when the keys are inputted, words generated by combinations of the characters assigned to the inputted keys according to an input order are displayed. The predictive input method further includes an ambiguous key sequence. The sequence includes: assigning 'space' to a symbol key; and when the symbol key is inputted, displaying at least one of phrases and sentences including 'space'. The sequence may further include: assigning a plurality of symbols to the symbol key; and when the symbol key is inputted, displaying at least one of phrases and sentences including at least one of the plurality of symbols. The sequence may further include: when there is no phrase or sentence to be displayed, registering a phrase or a sentence to be inputted. In the registering the phrase or the sentence, the word input method is used for words composed of the characters assigned to the inputted keys, except for the 'space', constituting the phrase or sentence. The sequence may further include displaying sentences even if keys are inputted only for a part of each word constituting the sentence.

Effect of the Invention

The configuration of the present invention allows the disambiguation input method to input a simple word, a phrase including a symbol, and even a whole sentence. For example, in order to input the name "Arnold J. Toynbee", the general vocabulary disambiguation input method is to input 'Arnold', 'J.' and 'Toynbee' sequentially by predicting them from the dictionary database and input 'space' between them to complete the input of the subject name. In contrast, when the key input of the ambiguous key sequence shown in Expression (3-1) through Expression (3-6) is performed according to the configuration of the present invent, the name phrase of 'Arnold J. Toynbee' as shown in FIG. 5A is displayed in the keypad area as a predicted phrase (shown in italics) and is able to be selected and inputted.

$$\text{'abc'-'pqrs'-'mno'-'jkl'-'def'-} \quad (3\text{-}1)$$

$$\text{'Sym'(ambiguous key representing symbols including 'space')-} \quad (3\text{-}2)$$

$$\text{'jkl'-} \quad (3\text{-}3)$$

$$\text{'Sym'-} \quad (3\text{-}4)$$

$$\text{'Sym'-} \quad (3\text{-}5)$$

$$\text{'tuv'-'mno'-'wxyz'-'mno'-'abc'-'def'-'def'} \quad (3\text{-}6)$$

In other words, the input procedure in the disambiguation input method consists of three steps of separate prediction/selection of words 'Arnold', 'J.', and 'Toynbee', respectively. However, in the present invention, these three steps are shortened to a single step so that convenience and speed of the input is enhanced. Simply performing the ambiguous key sequence of Expression (4) composed of the ambiguous key corresponding to the first letter of each word and the ambiguous 'Sym' key (corresponding to L11 in FIG. 1A), 'Arnold J. Toynbee' is able to be inputted if it is registered in the database and extracted as a predicted phrase.

$$\text{'abc'-'Sym'-'jkl'-'Sym'-'Sym'-'tuv'} \quad (4)$$

In this context, the phrase disambiguation input method using the 'Sym' key in the same manner as the character key has an effect of simplifying the vocabulary disambiguation input. Furthermore, the input procedure to extract 'Arnold Toynbee' as a predicted phrase may be shortened as Expression (5).

'abc'-'Sym'-'tuv'-'mno'- (5)

In the same token, a method is provided in which 'Arnold Toynbee' is predicted by entering only the 'abc' key for the first character of 'Arnold' followed by the 'Sym' key for 'space' and the whole ambiguous key sequence for 'Toynbee' corresponding to the surname. This will be described in more detail in Embodiment 5 and Embodiment 6.

The configuration of the present invention applies not only to the phrases mentioned above but also to sentences like the following. When the key input corresponding to Expression (6) is inputted to input 'Where are you going?', sentences including 'Where are you going?' are listed according to the composition in which the first letter of the first word is one of 'w, x, y, z', the first letter of the second word is one of 'a, b, c', the first letter of the third word is one of 'w, x, y, z' and the first letter of the fourth word is one of 'g, h, i'. Then 'Where are you going?' is selected and inputted which provides extreme convenience.

'wxyz'-'Sym'-'abc'-'Sym'-'wxyz'-'Sym'-'ghi' (6)

This configuration is the same as in the vocabulary disambiguation input method in the respect that if the key input for the ambiguous key sequence 'abc'-'mno'-'wxyz' is performed to input 'boy', words of 'any', 'amy', 'cox', 'box', 'cow', 'bow', 'cmx', 'coy', and 'coz' including 'boy' are listed to be selected and inputted and if an ambiguous key sequence of 'ghi'-'mno'-'pqrs'-'mno'-'pqrs' is performed in order to input 'important', not only 'import' but also 'important' is listed to be selected and inputted.

The configuration described in the above is more effective when applied to a wearable device like a smart watch as shown in FIG. 9A representing the post-smartphone mobile device. A smart watch has a circular shape instead of a rectangle. Accordingly, by providing a keyboard of the shape shown in FIG. 9B, the convenience of inputting characters in a smartphone and the fast input can be achieved even in the wearable device.

BRIEF DESCRIPTION OF THE DRAWINGS

FIGS. 1A-1C—Keystroke sequence for entering 'www.fda.gov' and the state showing that 'www.fda.gov' is predicted and displayed on the screen if it is registered in the database after the keystroke sequence FIGS. 2A-2C—The situation where predicted words are displayed on the screen after key input is performed to input 'boy'

FIGS. 3A-3B and 4A-4N—The procedure of inputting '123@ivy.net' according to the configuration of the present invention FIGS. 5A-5B and 6A-6T—The procedure of inputting 'Arnold J. Toynbee' according to the configuration of the present invention FIG. 7A-7F—The procedure of inputting 'Where are you going?' according to the sentence disambiguation input method FIG. 8—The procedure of inputting 'www.fda.gov' into the search window using the phrase disambiguation input method FIG. 9A-9B—9-key Keypad applied to a smartwatch for the sentence disambiguation input method

MODE FOR CARRYING OUT THE INVENTION

<Inputting of 'Boy' by the Disambiguation Input Method>

Figure 2A:
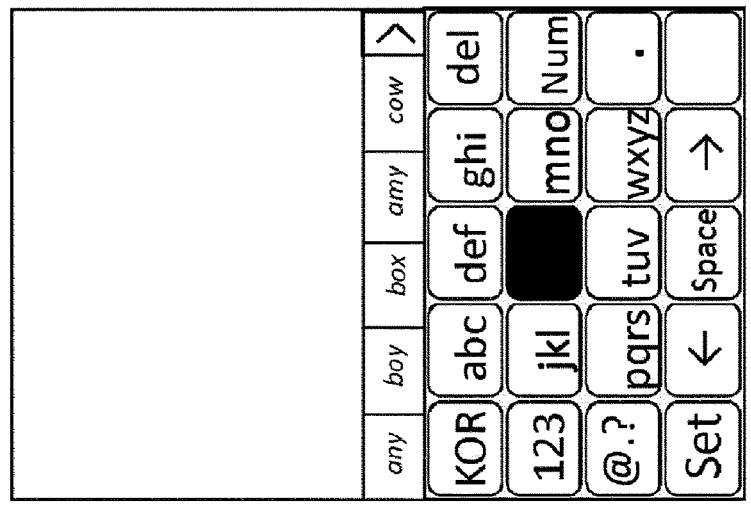
Figure 2B:
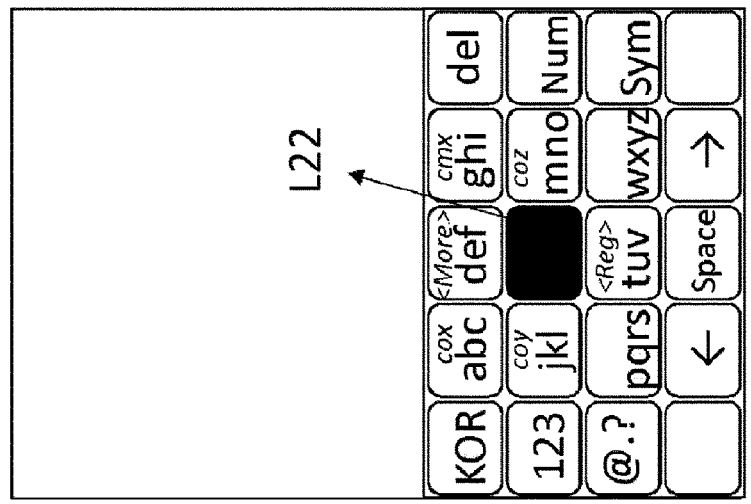
Figure 2C:
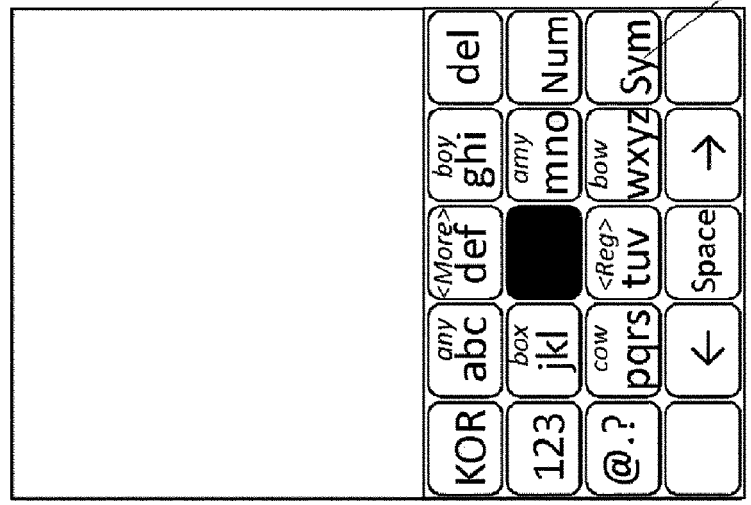

FIGS. 2A-2C illustrate a case in which predicted words including 'boy' are displayed on a touch screen according to disambiguation input method when the ambiguous key input is performed in the sequence of ['abc'-'mno'-'wxyz'] to input 'boy'. These predicted words which have one of 'a, b, c' as the first letter, one of 'm, n, o' as the second letter and one of 'w, x, y, z' as the third letter are selected from the dictionary database and displayed according to the order of the frequency of use.

Figure 9A:
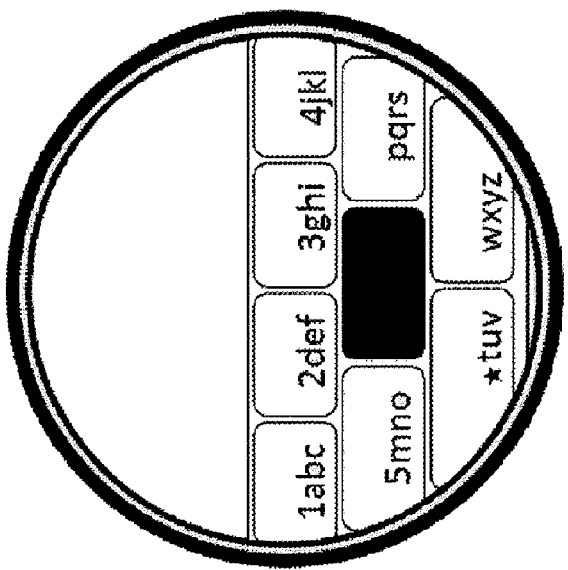
Figure 9B:
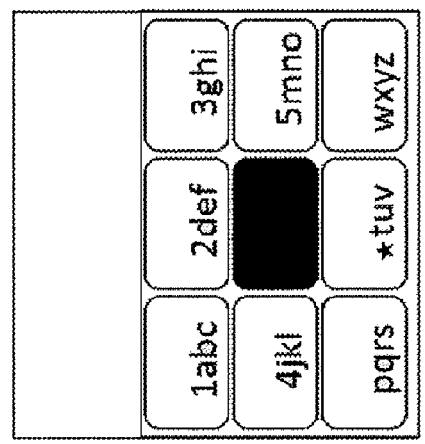

FIGS. 2A and 2B show a case where predicted words are displayed inside a keypad, and FIG. 2C shows a case where predicted words are displayed in a separate area above the keypad. In the case of FIG. 2C, in order to input a predictive word, the area of the word to be inputted in the predicted word list displayed on the keypad is touched and, then, it is inputted. In the case of FIGS. 2A and 2B, since the predicted word is displayed inside the keypad and touching the area in which the predicted word is displayed corresponds to the operation of pressing each key, a predicted word displayed on the key is inputted by dragging a finger from a black key in the center of the keypad to the key in which a predicted word is displayed and releasing the finger. In the case of FIGS. 2A and 2B, if a finger is moved on touch by a certain distance regardless of a direction from a key on which a predictive word is displayed, the predicted word can be inputted. When a predicted word is input by one of two methods mentioned above, the central black key L22 may be used in replacement of the 'Sym' key L21 in FIG. 2A. The vocabulary disambiguation input method shown in FIGS. 2A and 2B is advantageous over the method shown in FIG. 2C so that the keypad input area can be reduced because a separate area for displaying a predicted word is not needed. An example of utilizing these advantages is the keypad in a smart watch shown in FIG. 9.

Embodiment 1

<Input of Email Address '123@Ivy.Net' by the Phrase Disambiguation Input Method>

FIG. 2C shows a keypad layout of the general vocabulary disambiguation input method.

In order to input an email address '123@ivy.net' in this general disambiguation input method, the following procedure is performed.

(i) Enter '123' in numeric mode (ii) Switch to symbol mode and enter '@'

(iii) Switch to English mode and input 'ivy' with the disambiguation input method (iv) Switch to Symbol Mode and input '.'

[If period "." Is assigned to one of the keys located at the rightmost column of the keypad of FIG. 2C, symbol mode switching is optional and in this case, it is not necessary to switch to English mode in the process (v)]

(v) Switch to English mode and input 'net' by the disambiguation input method

Even if the input of '123@ivy.net' is made by the disambiguation input method, the inputting procedure becomes inconvenient because the procedure must accompany mode switches.

On the other hand, when using the phrase disambiguation input method with the keypad layout shown in FIGS. 1A-1C, '123@ivy.net' is inputted without the mode switch. If the key input according to the ambiguous key sequence of Expression (7) is performed, the predicted phrase '123@ivy.net' is displayed in the keypad area as shown in FIG. 3C and, then, '123@ivy.net' is selected to be inputted. The method of selecting '123@ivy.net' is the same as the method of selecting the predicted word 'boy' in FIGS. 2A-2C. That is to input by moving a finger from a black key in the center of the keypad to the key in which '123@ivy.net' is displayed and releasing the finger. Or by moving a finger from the key in which '123@ivy.net' is displayed by a certain distance regardless of the direction and releasing the finger.

'Num'-'Num'-'Num'-'Sym'-'ghi'-'tuv'-'wxyz'-
    'Sym'-'mno'-'def'-'tuv'                                    (7)

Figure 3A:
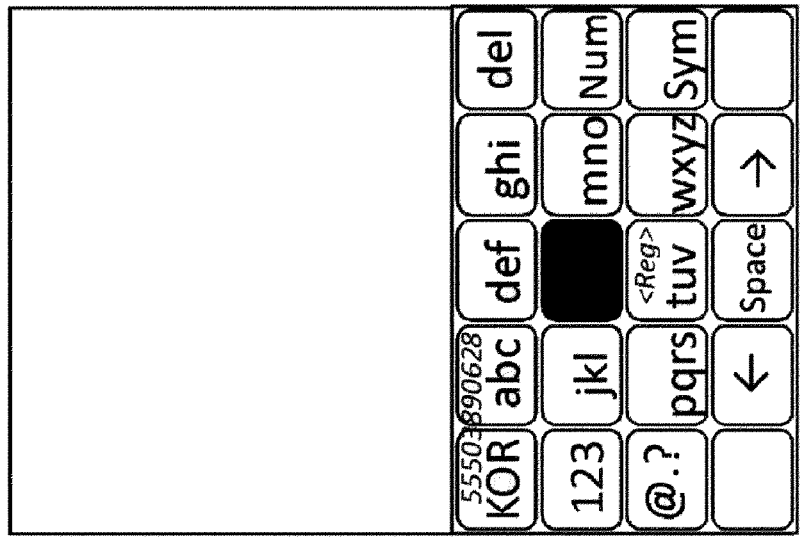
Figure 3B:
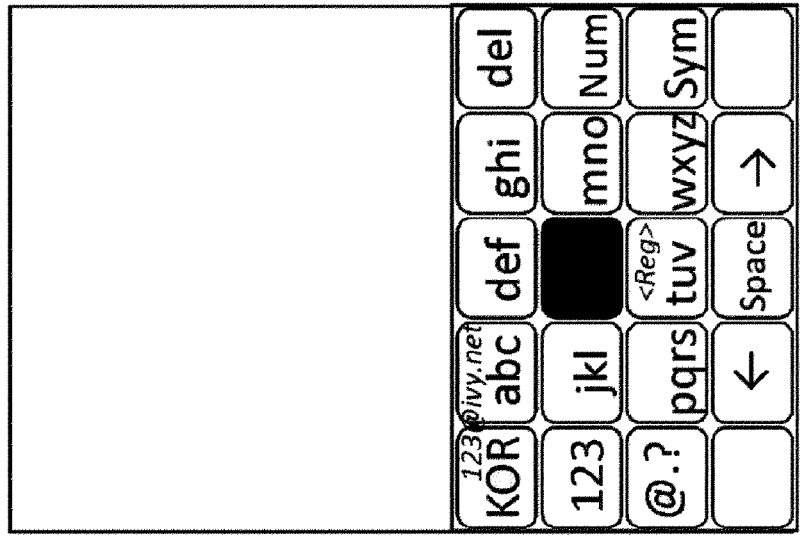

Here, 'Num' key refers to L31 in FIGS. 3A-3B and is an ambiguous key in which ten numbers from 1 to 0 are designated.

Embodiment 2

<How to Register Phrases in the Dictionary Database>

As shown in Embodiment 1, the phrase disambiguation input method according to the present invention provides a method of quickly inputting without mode switch ("character mode←→symbol mode") as compared to the multi-tapping method. Despite these advantages, one disadvantage of the disambiguation input method is in the case where the word (phrase) to be inputted is not registered in the dictionary database. Because it is not known that the word (or phrase) to be inputted is registered or not until the key input is completed. To overcome this, a method to register a phrase when the ambiguous key input is completed even if it is found not registered in the database will be described.

FIGS. 4A-4N illustrate a procedure of registering '123@ivy.net' in the database when '123@ivy.net' is not registered in the database. In fact, the registration procedure of FIGS. 4A-4N is started from the case of FIG. 3B. This is the case in which the key input corresponding to Expression (7) is entered in order to input '123@ivy.net', and any phrase including '123@ivy.net' is not registered in the dictionary database. Thus, as shown in FIG. 3B, a numeric code sequence '55503890629' is displayed in the keyboard area instead of a predicted word, and the 'Reg' term is displayed together. The function of the 'Reg' term is to start the registration procedure shown in FIGS. 4A-4N and is always displayed in the keyboard even when the predicted words are displayed in order to get ready for the registration procedure. The reason for this is to cope with the case where the phrase corresponding to the inputted ambiguous key sequence is not already registered in the dictionary database. The method of selecting the 'Reg' term to start the registration procedure is the same as the method of selecting the predicted word in FIGS. 2A and 2B. Accordingly, if the 'Reg' term is selected, the registration procedure is started as shown in FIGS. 4A-4N. If this registration procedure is explained for the case of '123@ivy.net', the expanded keypads corresponding to the numeric code constituting the numeric code sequence '55503890629' are sequentially activated and the inputting proceeds. For reference, Table 2 shows the components of the expanded keypad corresponding to the numeric code.

TABLE 2

<Components of the expanded keypad corresponding to numeric code>

| numeric code | Components of expanded keypad |
|---|---|
| 1 | composed of 'a', 'b', 'c', 'A', 'B', 'C' keys |
| 2 | composed of 'd', 'e', 'f', 'D', 'E', 'F' keys |
| 3 | composed of 'g', 'h', 'i', 'G', 'H', 'I' keys |
| 4 | composed of 'j', 'k', 'l', 'J', 'K', 'L' keys |
| 5 | composed of '1', '2', '3', '4', '5', '6', '7', '8', '9', '0' keys |
| 6 | composed of 'm', 'n', 'o', 'M', 'N', 'O' keys |
| 7 | composed of 'p', 'q', 'r', 's', 'P', 'Q', 'R', 'S' keys |
| 8 | composed of 't', 'u', 'v', 'T', 'U', 'V' keys |
| 9 | composed of 'w', 'x', 'y' 'z', 'W', 'X', 'Y', 'Z' keys |
| 0 | composed of 32 symbol keys arranged in the qwerty keyboard and 'space' ` ~ ! @ # $ % ^ & * ( ) - _ = + [ ] { } ; : ' " , . ? < > / \| \ |

In this context, the first step of the registration procedure of '123@ivy.net' is that the expanded keypad corresponding to the first numeric code '5' of the numeric code sequence '55503890629' for '123@ivy.net' is activated as shown in FIG. 4A, and the first letter '1' of '123@ivy.net' is inputted. [In FIGS. 4A-4N, the dotted circle indicates the pressing operation.] FIGS. 4B and 4C show the procedure of inputting the second letter, '2' and third letter '3' of the '123@ivy.net' in which the numeric keyboard is activated again as in FIG. 4A since the second and third numeric codes of the numeric code sequence '55503890629' are '5'. FIG. 4D is a procedure for inputting '@' in which the symbol keypad corresponding to the fourth ambiguous key code '0' of the numeric code sequence '55503890629' is activated and the '$@~' key including '@' is touched. The remaining follows the registering procedure in the same manner as in FIG. 4A through FIG. 4D.

FIG. 4E shows that when '$@~' key is touched, '$', '@', '~' are extended to the left and right directions, and '@' is inputted by releasing the finger from the original key position. In FIG. 4F, inputting of 'i' is completed by touching the designated key 'i' after the expanded keypad composed of 'g', 'h', 'i', 'G', 'H' and 'I' keys is activated. When 'i' is inputted, the expanded keypad composed of 't', 'u', 'v', 'T', 'U', and 'V' keys is automatically activated and 'v' is inputted by touching the 'v' key. FIGS. 4H through 4M show steps of inputting 'y', '.', 'n', 'e' and 't' in sequence.

When this registration procedure is completed, '123@ivy.net' is entered into the input window and it is simultaneously registered in the dictionary database internally. (L41) Hence there is no need to worry about its registration in the database. If the key input corresponding to the numeric code sequence '55503890629' [corresponding to Expression (7)] is performed after the registration of '123@ivy.net' as described above, '123@ivy.net' is displayed as a predicted phrase as shown in FIG. 4N so that selection and input of it can be achieved with no need of registering it again.

Embodiment 3

<Inputting a Phrase Including 'Spaces' with the Disambiguation Input Method>

Figure 5A:
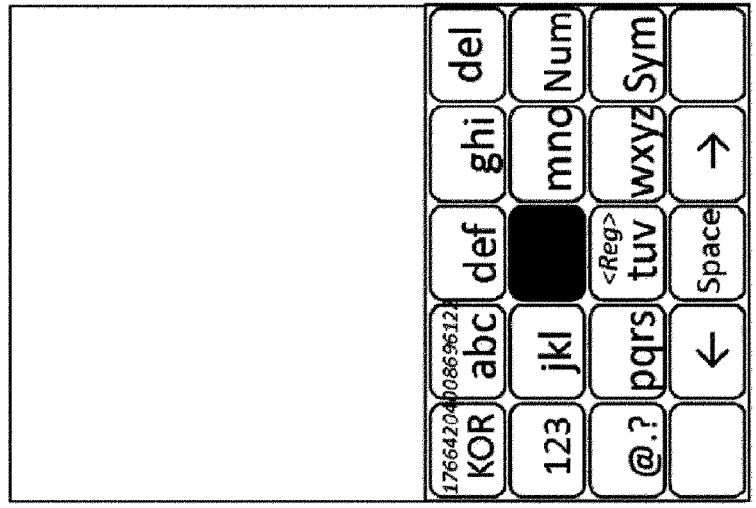
Figure 5B:
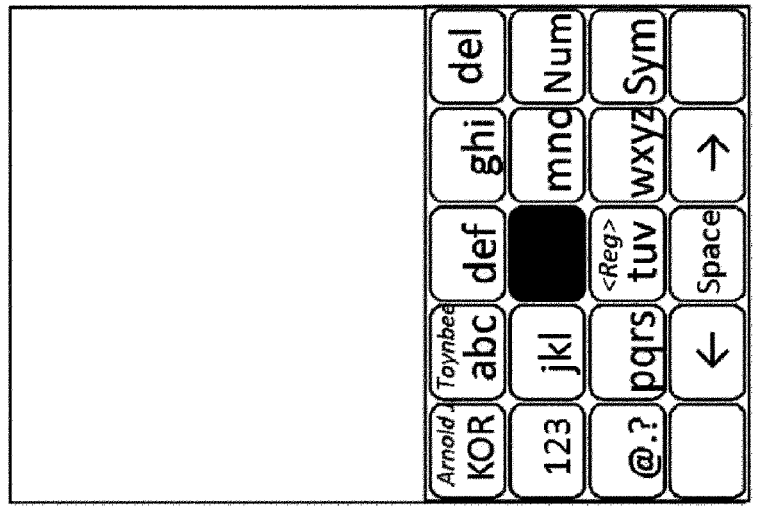

FIGS. 5A-5B show a one-step procedure of inputting 'Arnold J. Toynbee' which has 'spaces' according to the configuration of the present invention. As already described in the embodiment 2 for the input procedure of '123@ivy.net', the ambiguous key sequence to input 'Arnold J. Toynbee' using the keypad shown in FIGS.

1A-1C is Expression (3). The difference between 'Arnold J. Toynbee' and '123@ivy.net' is that 'space' is treated like a symbol and the ambiguous key input for 'space' is performed by the 'Sym' key.

When the key input procedure according to Expression (3) is completed, 'Arnold J. Toynbee' is displayed as a predicted phrase in the keypad area so as to be selected and inputted as in Embodiment 2. If there is no predicted phrase corresponding to Expression (3) in the dictionary database for the ambiguous input method, the numeric code sequence '17664204008696122' of Expression (3) is displayed as a predicted word in the keypad area as shown in FIG. 5B which implies that there is no registered phrase corresponding to numeric code sequence '17664204008696122'. In this case, the 'Reg' term is displayed in the keypad area. If this is selected, the procedure of registering this phrase in the dictionary database is started. Here, the method of selecting the 'Reg' term is the same as for the predicted word selection method already described. Even if 'Arnold J. Toynbee' is already registered in the dictionary database, the 'Reg' term is displayed in order to always get ready to start the registration procedure. The reason is as follows; the reduced size of the database in the memory of the device by registering just the frequently used phrases makes the phrase prediction procedure fast and is desirable than registering all the phrases to avoid the additional registering procedure.

FIGS. 6A-6T show the procedure of registering 'Arnold J. Toynbee' in the dictionary database. In this registration process, the expanded keypads corresponding to the respective numeric codes constituting the numeric code sequence '17664204008696122' of 'Arnold J. Toynbee' are sequentially activated according to the rules of Table 2, and the letters and symbols constituting 'Arnold J. Toynbee' (Including 'space') are inputted in the order. Specifically, in the state of FIG. 5A, if the user moves the finger from the center black key to the 'Reg' key while in touch by the drag motion and the finger is released from the keyboard, the expanded keypad composed of 'a', 'b', 'c', 'A', 'B', and 'C' keys are displayed. When the first letter 'A' is touched on the screen, 'A' is inputted and at the same time the procedure of registering in the database is started. When registration procedure from FIG. 6B to FIG. 6T is completed, 'Arnold J. Toynbee' is inputted into the input window and is registered in the database at the same time. Then, after the 'Arnold J. Toynbee' is registered in the database, if key input is completed like the key sequence of Expression (3), 'Arnold J. Toynbee' is displayed on the screen as a predicted phrase as shown in FIG. 5A so that it can be selected and inputted.

In order to enter the 'space' included in the 'Arnold J. Toynbee' during the registration procedure of it, the symbol keypad shown in FIG. 6G is activated. And if the black key at the center is touched [In the registration procedure shown in FIGS. 6A-6T, the dotted circle indicates a position where a finger touches.] a total of nine symbols including the 'space' are arranged as shown in FIG. 6H in which 'space' is assigned to the center black key. So, if the finger is released while touching the center key without moving toward the surrounding keys, 'space' is inputted.

Thus, phrases and even sentences including 'spaces' can be easily inputted by the disambiguation input method because 'space' is handled like characters or symbols.

Embodiment 4

<Inputting Sentences by the Disambiguation Input Method>

Figure 7A:
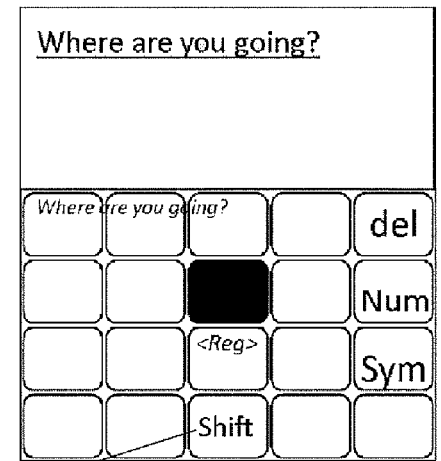

As shown in Embodiment 1 and Embodiment 3, numbers, symbols, and 'space' can also be inputted through the disambiguation input method, so that the sentence also can be easily inputted through the disambiguation input method. As an example, when 'Where are you going?' is inputted according to the general vocabulary disambiguation input method, each word of the sentence 'Where', 'are', 'you', and 'going' is respectively extracted from the dictionary database and inputted while 'spaces' are inputted between them. In contrast, symbols are treated as characters in the present invention. And if key inputs corresponding to Expressions (8-1) to (8-7) are performed, 'Where are you going?' is displayed in the keyboard area as a predicted word as shown in FIG. 7A and is selected and inputted like a predicted word.

'wxyz'-'ghi'-'def'-'pqrs'-'def' (8-1)

-'Sym' (8-2)

-'abc'-'pqrs'-'def' (8-3)

-'Sym' (8-4)

-'wxyz'-'mno'-'tuv' (8-5)

-'Sym' (8-6)

-'ghi'-'mno'-'ghi'-'mno'-'ghi' (8-7)

-'Sym' (8-8)

Embodiment 5

<Procedure for Easy Registering of a Sentence in a Dictionary Database>

Figure 7B:
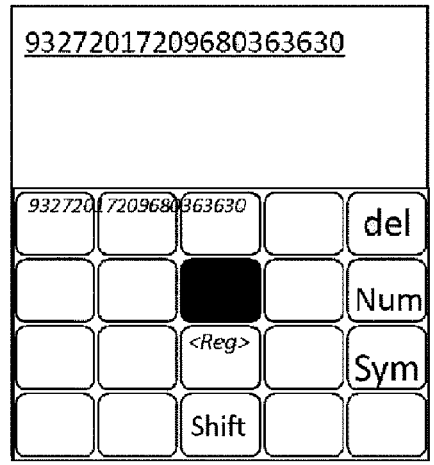

As shown in FIGS. 4A-4N and 6A-6T, when the phrase (word) which is to be inputted is not registered in the dictionary database for the ambiguous input method, the method registering it in the database is such that the expanded keypad corresponding to each number of the numeric code sequence is activated and the letters, numbers and symbols constituting the phrase are inputted one by one in the order. Such a phrase registration method has no problem when the phrase is short, but if the sentence to be inputted is not registered in the dictionary database and it is long as in Embodiment 4, it is inconvenient to register the letters constituting the sentence one by one. To overcome this, the vocabulary disambiguation input method is used in the sentence registration procedure. That is, if the sentence 'Where are you going?' is not registered in the sentence database after performing the ambiguous key input corresponding to Expression 8, numeric code sequence '93272017209680363630' is shown in the keyboard area as in FIG. 7B instead of 'Where are you going?' as a predicted word. In this case, by selecting the 'Reg' key shown in FIG. 7B the registration procedure for 'Where are you going?' is started. The difference of the registration procedure illustrated in this embodiment from the registration procedure illustrated in Embodiment 2 is as follows. In Embodiment 2, when the 'Reg' key is selected, the expanded keypads corresponding to the numeric codes constituting the numeric code sequence are sequentially activated based on Table 2, and the letters constituting the sentence are registered one by one. On the other hand, in the registration procedure of this embodiment, if words or numbers constituting a sentence can be inputted by the disambiguation input method, only those parts excluding words and numbers are registered character by character as in Embodiment 2. Therefore, the first step of the registration in the present embodiment is the procedure of dividing the numeric code sequence of a sentence into portions of non-symbols and symbols. In other words, the numeric code sequence '93272017209680363630' is divided into subsections with numeric key code '0' designating symbol as the separating boundary in order to divide it into non-symbol groups and symbol groups as the following.

['93272','0','172','0','968','0','36363','0']  (9)

In these segmented numeric code sequences, the sentence registration procedure is performed using the disambiguation input method for a portion that does not include '0'. Since the first numeric code sequence '93272' of the segmented ambiguous numeric code sequence of Expression (9) is a numeric string designating characters, 'where' is displayed as the predicted word which is equivalent to the numeric code sequence '93272' and is selected by the way as selecting the predicted word. Then 'where' is registered as the first phrase of the sentence and at the same time is inputted to the input window. (L71)

Figure 7C:
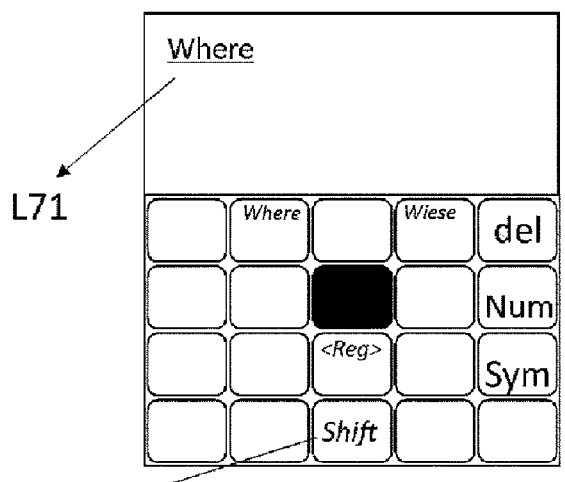

[In FIG. 7C, 'w', which is the first letter of 'Where', is shown by an uppercase letter. This is because it is changed to 'Where' by pressing the 'shift' key while 'where' is displayed as a predicted word. In FIG. 7C, the shift key L73 is italicized, which means that the shift key L73 is pressed.]

Figure 7D:
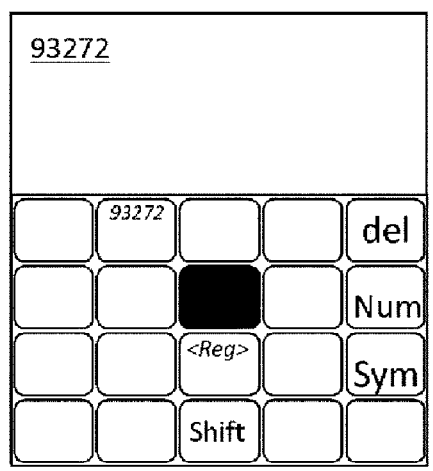
Figure 7E:
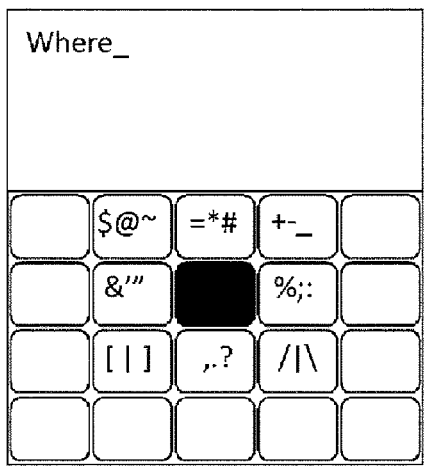
Figure 7F:
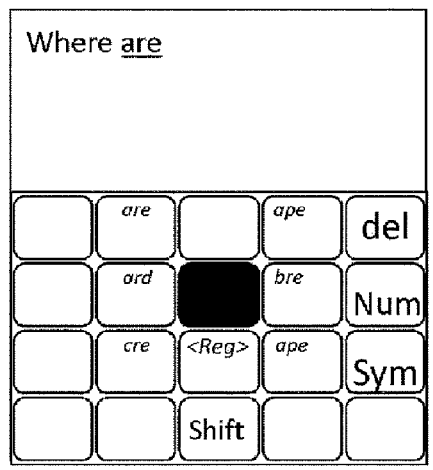
Figure 8:

If 'where' is not registered in the dictionary database, the numeric code sequence '93272' is displayed in the keypad area as shown in FIG. 7D. In this state, if 'Reg' is selected, the expanded keypads corresponding to the numeric code sequence '93272' are activated sequentially according to the configuration of Table 1, and by inputting characters one by one in the same way as in Embodiment 2 and Embodiment 4 'where' is registered in the database and is inputted in the input window (L74). When this step corresponding to '93272' is completed, the next step which is the registering 'space' is proceeded and the symbol keypad is activated as shown in FIG. 7E. In this state, if a finger is released after touching the center black key, a 'space' is inputted and the next step corresponding to the second numeric string '172' which is the second numeric code sequence of (9) is executed. So 'are' is displayed in the keypad area as a predicted word and is able to be selected and inputted. Hereinafter, the registration procedures corresponding to 'you' and 'going' proceed in the same manner, so that the sentence registration procedure is completed and at the same time 'Where are you going?' is inputted into the input window.

[Note that the procedure of registering 'Where' in the dictionary database is performed as part of the sentence registration procedure and 'W' in 'Where' is registered in upper case. But if 'Where' is not registered in dictionary database it is preferable to register it in the dictionary database as 'where' with a lowercase letter. The reason is that there will be no problem if 'where' is to be inputted as a lowercase letter. But, if 'Where' is registered instead of 'where' and key input corresponding to the numeric code sequence '93272' is performed, 'Where' is displayed as a predicted word and there is no way to change the 'W' of 'Where' to a lower case. In this case, therefore, a situation occurs in which 'where' is to be registered as a new word in distinction from 'Where' in the dictionary database.]

As described above, if a word is registered as a part of the sentence registration process, it brings the effect of registering the word in the dictionary database simultaneously with the sentence registration. Therefore, if the sentence registration procedure of this embodiment is applied to the registration process of 'Arnold J. Toynbee' of Embodiment 3, the procedure of FIG. 6A to FIG. 6F and that for FIG. 6M to FIG. 6S are reduced to one step for predicting/selecting/inputting of 'Arnold' and 'Toynbee' if 'Arnold' and 'Toynbee' are already registered in the dictionary database. And it brings the advantage of simplifying the registration in dictionary database and input of them. If 'Arnold' and 'Toynbee' are not registered in the dictionary database, the procedure is carried out as in FIGS. 6A-6T.

Embodiment 6

<Simplification of Key Input for Phrases and Sentences in the Disambiguation Input Method>

In Embodiments 1, 3 and 4, an inputting method of phrases and 'spaces' including not only symbols but also 'space' in the disambiguation input method is illustrated. The method further simplifying the key input for phrases and sentences in the disambiguation input method will be described.

The ambiguous key sequence for inputting 'Who is he?' according to the method of Embodiment 3 as the sentence disambiguation input method is Expression (10-2). And Expression (10-3) is the case of key input sequence in which only the ambiguous keys corresponding to the first letters 'w', 'i' and 'h' of the words constituting 'Who is he?' is inputted. Unlike Expression (10-2), the sentence extraction is achieved with the input of ambiguous keys corresponding to the first letters of the constituting words. This is in the same context as in the vocabulary disambiguation input method where ambiguous keys corresponding to 'import' is inputted in order to predict 'important', not only 'import' but also 'importance' and 'important' are predicted. The key point to the simple key input such as Expression (10-3) is to make it possible to predict the sentence with typing in only a portion of elements that make up the sentence which is to be inputted except for symbols and 'spaces'.

Who is he?  (10-1)

'wxyz'-'ghi'-'mno'-'Sym'-'ghi'-'pq rs'-Sym-'ghi'-'def'-'Sym'  (10-2)

'wxyz'-'Sym'-'ghi'-'Sym'-'ghi'-'Sym'  (10-3)

Therefore, in order to predict a sentence by keying only a part of a word constituting the sentence, the sentence extraction criteria are specified in Table 5. In the following, it will be illustrated how the sentence of Table 3 which is registered in the database is extracted as a predicted sentence with the ambiguous key input in Table 4 by applying the criteria of Table 5 to the sentence of Table 3 and the ambiguous key input of Table 4.

<6-I. Calculate Sentence Extraction Variable, Numeric Code Sequence, from the Sentence which is Registered in the Database>

As shown in Table 3, the sentence registered in the database is represented by the corresponding ambiguous key sequence. The ambiguous key sequence expressed in this way is subdivided by the boundary of 'Sym' keys. These subdivided portion is called 'segment.' These segments are arranged in the corresponding order starting from the first row. Then, a numeric code sequence is calculated according to the ambiguous key sequence of each segment according to Table 1. This numeric code sequence is written in the corresponding segment of the second column of Table 3.

<6-II. Calculate Sentence Extraction Variable, Numeric Code Sequence, from the Key Input>

As in the above paragraph <6-I>, the numeric code sequence is calculated based on Table 1 from the ambiguous key sequence of the key input for the sentence disambiguation, and then written in the corresponding segment.

The numeric code sequence (corresponding to the numeric code sequence of the sentence in the database) calculated in paragraph <6-I> and the numeric code sequence (corresponding to the numeric code sequence of the key input) calculated in paragraph <6-II> are compared to each other according to the criteria in Table 5. When the criteria 1 and 2 are satisfied, the key input for the sentence disambiguation is regarded to be consistent with the sentence of the database, and the sentence of the database is extracted as the predicted sentence. By comparing the numeric code sequence of the 'Where are you going?' which is registered in the database of Table 3 and the numeric code sequence for the ambiguous key input of Table 4, the procedure to determine whether the key input of Table 4 can predict the sentence in Table 3 which is registered in the database with respect to the criteria in Table 5 will be described.

That is, the numeric code sequence of key sequence 1 of Table 4 (hereinafter referred to as "A") and the sentences of Table 3 (hereinafter referred to as "B") are compared according to the criteria of Table 5. The result is the following.

When comparing the number of digits of the numeric code sequence of A and B according to criterion 1, the numeric code sequence of B is '93272' in the case of the first segment and its number of digits is 5. And the numeric code sequence of A is '932' and Its number of digits is 3 which is smaller than that of the numeric code sequence of B. Hence the criterion is satisfied. For Segments 2 through 7 all of them satisfy the criterion since the number of digits of numeric code sequence of A is less than or equal to the number of digits of B's numeric code sequence. Finally, since the 8th segment has no numeric code sequence for the key input whose number of digits is 0 and the numeric code sequence of the database sentence is '0' whose number of digits is 1, the criterion 1 is satisfied.

Based on criterion 2, the numeric code sequence of A and B are compared segment by segment for the match from the beginning. In the case of the first segment, since the numeric code sequence of B is '93272' and the numeric code sequence of A is '932', they are the same in the first three digits. Therefore, the criterion is satisfied. Then, when comparing from the second segment to the seventh segment, the numeric code sequence of A matches the numeric code sequence of B when compared from the first digit. Hence, they meet the criterion. In the case of the $8^{th}$ segment, since there is no numeric code sequence for the key input, the criterion 2 is satisfied. Accordingly, the key sequence 1 corresponding to the key input in Table 4 satisfies the criteria of Table 5, and the 'Where are you going?' is predicted from the database as a predicted sentence so that its selection and input becomes possible.

As key sequence 1 of Table 4 is compared with the sentence in the database in the above, if key sequence 2 in Table 4 is compared with the sentence 'Where are you going?' in Table 3, the sentence in Table 3 have only 8 segments while key sequence 2 has even ninth segment in which case the criterion 2 is not satisfied. Hence 'Where are you going?' cannot be extracted as a predicted sentence.

TABLE 3

| Where are you going? | | |
|---|---|---|
| ambiguous key sequence | numeric code sequence | Segment |
| 'wxyz'-'ghi'-'def'-'pqrs'-'def'- | 93272 | $1^{st}$ |
| 'Sym'- | 0 | $2^{nd}$ |
| 'abc'-'pqrs'-'def' | 172 | $3^{rd}$ |
| 'Sym' | 0 | $4^{th}$ |
| 'wxyz'-'mno'-'tuv' | 968 | $5^{th}$ |
| 'Sym' | 0 | $6^{th}$ |
| 'ghi'-'mno'-'ghi'-'mno'-'ghi' | 36363 | $7^{th}$ |
| 'Sym' | 0 | $8^{th}$ |

TABLE 4

| key sequence 1 | | | key sequence 2 | |
|---|---|---|---|---|
| ambiguous key sequence | numeric code sequence | Segment | ambiguous key sequence | numeric code sequence |
| 'wxyz'-'ghi'-'def' | 932 | 1st | 'wxyz'- | 9 |
| 'Sym'- | 0 | 2nd | Sym'- | 0 |
| 'abc'-'pqrs'-'def' | 172 | 3rd | 'abc'- | 1 |
| 'Sym' | 0 | 4th | Sym' | 0 |
| 'wxyz'-'mno'-'tuv' | 968 | 5th | 'wxyz'-'mno'-'tuv' | 968 |
| 'Sym' | 0 | 6th | Sym'- | 0 |
| 'ghi'-'mno'-'ghi' | 363 | 7th | 'ghi'-' | 3 |
| | | 8th | 'Sym'- | 0 |
| | | 9th | 'abc'- | 1 |

TABLE 5

| Criterion 1 | When comparing the number of digits for the numeric code sequence in each segment, the numeric code sequence for the key input must have the same number of digits as or smaller than the numeric codesequence for the sentence in the database. (If there is no numeric code sequence in the segment, the number of digit of the numeric code sequence is treated as 0 (zero).) |
|---|---|
| Criterion 2 | If Criterion 1 is met, the numeric code sequence for the key input in each segment must match from the first digit with the numeric code sequence for the sentence in the database. (If there is no numeric code sequence of key input, it meets Criterion 2.) |

TABLE 6

| key sequence 3 | | | key sequence 4 | |
|---|---|---|---|---|
| ambiguous key sequence | numeric code sequence | Segment | ambiguous key sequence | numeric code sequence |
| 'wxyz'- | 932 | 1st | 'wxyz'- | 9 |
| 'Sym'- | 0 | 2nd | Sym'- | 0 |
| 'abc'-' | 172 | 3rd | 'abc'- | 1 |
| 'Sym'- | 0 | 4th | Sym' | 0 |
| 'wxyz'-' | 968 | 5th | 'wxyz'-'mno'-'tuv' | 968 |
| 'Sym'- | 0 | 6th | | |
| 'ghi'- | 3 | 7th | | |

If the key sequence 3 and key sequence 4 shown in Table 6 are compared with the sentences of Table 3 (assuming the registered sentence in the database) by applying the criterion of Table 5, both key sequence 3 and key sequence 4 are able to extract 'Where are you going?' from the database as the predicted sentence so that it can be selected and inputted. That is, even if only the first letter of each word in 'Where are you going?' is inputted, it can be extracted as a predicted sentence (in case of key sequence 3) or even when an ambiguous key input is performed only up to 'you' (in the case of key sequence 4) 'Where are you going?' is extracted and able to be selected and inputted. If the criteria of Table 5 are applied to the procedure of extracting the predicted sentences from the database in order to implement the simple key input for the convenience, it is possible to extract the predicted sentences even with a partial input of the sentences. Then the implementation of the simple key input is achieved.

Embodiment 7

<Inputting Simple Web Address>
The sentence disambiguation input method described in Embodiment 6 can be applied to the inputting of web address. For example, to enter the web address phrase "www.fda.gov", the keystroke which is generally represented by Expression (11) must be entered.

'wxyz'-'wxyz'-'wxyz'-'Sym'-'def'-'def'-'abc'-
'Sym'-'ghi'-'mno'-'tuv'    (11)

However, if the simplified input method for the sentence disambiguation input method of Embodiment 6 is applied, it becomes possible to extract 'www.fda.gov' from the dictionary database to be selected and inputted even by the key input corresponding to Expression (12).

'wxyz'-'Sym'-'def'-'def'-'abc'-'Sym'-'ghi'-'mno'-
'tuv'    (12)

Since the web address generally starts with 'www.', 'www.fda.gov' can be extracted from the dictionary database and inputted even if the key input is performed as in Expression (12).

Embodiment 8

<Internet Search Using Disambiguation Input Method and Utilization of Dictionary Database>
Up to Embodiment 7, phrases or sentences were inputted with the disambiguation input method through the procedure of extracting sentences from the dictionary database. And vocabulary disambiguation input method has been used as input method for mobile devices with limited number of keys. Since most of these mobile devices are connected to the Internet, it is more efficient to use the dictionary database stored in the Internet server for the vocabulary disambiguation input method than to use the dictionary database built in the mobile device. In the case of words, it is possible to construct a dictionary database with a memory of several megabytes, but in the case of sentences, a much larger memory capacity is required. Therefore, it is advantageous to use the memory of the Internet server rather than to store the database in a mobile device. Furthermore, it is faster to do a query procedure to extract data from a database using a high-performance processor of an Internet server than to perform a query procedure on a mobile device. This is because the internet transmission speed of the mobile device reaches to gigabyte per second and the transmission of the process result from the server to the mobile device is carried out almost in a real time. Hence it is not necessary to have the database in mobile devices.

If the sentence disambiguation input method can be applied to the Internet search engine such as Google, Yahoo, Bing, etc., it will provide a convenient search method even for the case of those devices such as a smart watch in which the input is difficult with a general input method due to the limited number of keys. For this, however, the searching index of the database which each search engine use should be constructed as shown in Table 7. That is, the searching index corresponding to words (phrases, web addresses, sentences, etc.) should be constructed not only by general string codes but also by ambiguous key sequences. Since the numeric code sequence in Table 7 is calculated based on Table 1, it should be changed accordingly if the contents of Table 1 are changed.

TABLE 7

| string code | ambiguous key sequence | numeric code sequence according to Table 1 |
|---|---|---|
| "www.fda.gov" | 'wxyz'-'wxyz'-'wxyz'-'Sym'-'def'-'def'-'abc'-'Sym'-'ghi'-'mno'-'tuv' | '99902210368' |
| "www.efa.gov.in" | 'wxyz'-'wxyz'-'wxyz'-'Sym'-'def'-'def'-'abc'-'Sym'-'ghi','mno','tuv'-'Sym'-'ghi','mno' | '99902210368036' |
| "We will be back." | 'wxyz'-'def'-'Sym'-'wxyz'-'ghi'-'jkl'-'jkl'-'Sym'-'abc'-'def'-'Sym'-'abc'-'abc'-'abc'-'jkl' | '920934401201114' |

When the database of the search engine is constructed as shown in Table 7, a link to the US FDA website is displayed in the keypad area if the ambiguous key input corresponding to Expression (13) is made into the input window of the search engine and it is executed. Then the address ('www.fda.gov') on the keypad area is selected or the address from the lists displayed on the screen is touched to be selected.

'wxyz'-'wxyz'-'wxyz'-'sym'-'def'-'def'-'abc'-
'sym'-'ghi'-'mno'-'tuv'    (13)

As such, the Internet site can be easily connected with the keypad shown in FIGS. 1A-1C and even inputting sentences can be easily done. In the smart watch which has currently got an attention as the post-smartphone mobile device, internet search, input of sentences used in daily life and even input of password can be easily performed with not much difference from the smartphone.

Embodiment 9

The sentence disambiguation input method described in the above-described embodiments has been described with respect to the key input method of touch on screen. But it may also be applied to key input method on the keypad with depressing keys. The only difference is that in the case of the touch method, the function of selecting the predicted word is assigned to the drag operation in which a key is just touched for the ambiguous key input and the drag operation is specified for the function of selecting and inputting the predicted word or predicted sentence. However, since the drag operation cannot be performed for the input method on the keypad with depressing keys, the sentence disambiguation input method of the present invention can be applied to the keypad with depress keys if the drag operation is replaced with a long depressing operation.

Embodiment 10

For the sentence disambiguation input method of the present invention, a symbol or 'space' is assigned to an ambiguous key like a character. However, in the case of 'space', it is possible to reduce the number of key inputs by assigning to the drag motion the function of inputting the ambiguous characters and 'space' at the same time. In other words, if 'abc' ambiguous key is touched and drag more than a certain distance while in touch, it takes the function of inputting 'abc' and 'Sym' keys in sequence. In this case, the function of selecting and inputting the predicted word (sentence) which is performed by touching the 'abc' key and subsequent dragging must be implemented in a different way.

As described above, the sentence disambiguation input method according to the present invention can improve the convenience and efficiency of input even with a small number of keys, so that it can demonstrate its effectiveness in a mobile device such as a smart watch. Further, the present invention will bring a big momentum to expanding the usability of those devices such as remote controllers which have not been used for text communication up to present time due to limited number of keys.

Although the example embodiment has been explained above, the present disclosure is not limited thereto. It is clear that various changes and modifications may be made by those skilled in the art in the scope of the present disclosure defined by the following claims, and it shall be understood that all modifications and embodiments conceived from the meaning and scope of the claims and their equivalents are included in the scope of the present disclosure.

The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent applications may need to be revisited.

We claim:

1. An input device implementing a predictive input method in which a plurality of characters are assigned to each of a plurality of character keys and 'space' is assigned to a symbol key, the predictive input method includes a phrase/sentence input method comprising:
    when a phrase/sentence input sequence, including inputs of the character keys and an input of the symbol key between the inputs of the character keys, is inputted, displaying at least one of phrases and sentences including 'space' between a plurality of words;
    wherein the input device comprises a database that stores phrases or sentences and a respective key sequence for each phrase or sentence;
    the displayed phrases and sentences are extracted from the database, based on each segment of the phrase/sentence input sequence which is separated by the input of the symbol key and coincides with the corresponding segment of the key sequence for a phrase or a sentence stored in the database;
    extracting a first code sequence from the key sequence for phrase or sentence stored in the database;
    extracting a second code sequence from the inputted phrase/sentence input sequence;
    dividing the first and second code sequences into a plurality of segments by a code of the symbol key;
    determining whether a first criterion is satisfied for each segment, wherein the first criterion is satisfied when the number of codes of the second code sequence is less than or equal to the number of codes of the first code sequence;
    when the first criterion is satisfied, determining whether a second criterion is satisfied for each segment, wherein the second criterion is satisfied when each code of each segment of the second code sequence matches each code of each segment of the first code sequence from a first code to a last code of each segment of the second code sequence; and
    when the second criterion is satisfied, displaying phrase or sentence corresponding to the first code sequence.

2. The input device of claim 1, wherein the phrase/sentence input method further comprises:
    assigning a plurality of symbols to the symbol key; and
    when the symbol key is inputted, displaying at least one of phrases and sentences including at least one of the plurality of symbols.

3. The input device of claim 1, wherein the phrase/sentence input method further comprises:
    registering a phrase or a sentence to be inputted when there is no phrase or sentence to be displayed,
    wherein, the registering includes executing a word input method for words that include characters assigned to the inputted keys, except for the 'space', and
    the word input method comprises:
    when the character keys are inputted, generating word by combinations of the characters assigned to the inputted character kevys according to an input order are displayed.

4. The input device of claim 1, wherein the phrase/sentence input method further comprises:
    displaying sentences even if keys are inputted only for a part of each word of a sentence or even if no key is inputted for some of words of the sentence.

5. An input device implementing a predictive input method in which a plurality of characters are assigned to each of a plurality of character keys, and 'space' is assigned to a symbol key, the predictive input method includes a phrase/sentence input method comprising:
    when a phrase/sentence input sequence, including inputs of the character keys and an input of the symbol key between the inputs of the character keys, is inputted, displaying at least one of phrases and sentences including 'space' between a plurality of words,
    wherein the input device comprises a database that stores phrases or sentences and a respective key sequence for each phrase or sentence, and
    the displayed phrases and sentences are extracted from the database, based on each segment of the phrase/sentence input sequence which is separated by the input of the symbol key and coincides with the corresponding segment of the key sequence for a phrase or a sentence stored in the database, and
    wherein the phrase/sentence input method further comprises:
    dividing the key sequence stored in the database into a plurality of segments by the symbol key;
    dividing the inputted phrase/sentence input sequence into a plurality of segments by the symbol key; determining whether a first criterion is satisfied for each segment, wherein the first criterion is satisfied when the number of character keys of the inputted phrase/sentence input sequence is less than or equal to the number of character keys of the key sequence stored in the database;
    when the first criterion is satisfied, determining whether a second criterion is satisfied for each segment, wherein the second criterion is satisfied when each character key of each segment of the inputted phrase/sentence input sequence matches each character key of each segment of the key sequence stored in the database from a first character key to a last character key of each segment of the inputted phrase/sentence input sequence; and displaying phrase or sentence stored in the database corresponding to the key sequence which satisfies the first and second criterion.

\* \* \* \* \*